United States Patent [19]

Ballmer et al.

[11] Patent Number: 4,597,009
[45] Date of Patent: Jun. 24, 1986

[54] METHOD AND CIRCUIT ARRANGEMENT FOR VIDEO-RAPID DETERMINATION OF THE MEDIAN OF AN EVALUATION WINDOW

[75] Inventors: Horst Ballmer, Heidenheim; Henry Krämer, Leonberg, both of Fed. Rep. of Germany

[73] Assignee: Carl-Zeiss-Stiftung, Heidenheim, Fed. Rep. of Germany

[21] Appl. No.: 620,055

[22] Filed: Jun. 13, 1984

[30] Foreign Application Priority Data

Jun. 24, 1983 [DE] Fed. Rep. of Germany ....... 3322705

[51] Int. Cl.4 ............................................. H04N 7/18
[52] U.S. Cl. ..................................... 358/93; 358/107; 382/52
[58] Field of Search ................... 382/52; 358/93, 101, 358/106, 107, 139

[56] References Cited

U.S. PATENT DOCUMENTS 2,494,441  1/1950  Hiller ..................................... 377/11
4,205,341  5/1980  Mitsuya ................................. 382/52
4,468,704  8/1984  Stoffel ................................... 382/52

FOREIGN PATENT DOCUMENTS 0068358   5/1983  European Pat. Off. .
0069542  12/1983  European Pat. Off. .
1423636   5/1972  Fed. Rep. of Germany .
2128690   5/1974  Fed. Rep. of Germany .
2354769   3/1982  Fed. Rep. of Germany .

Primary Examiner—Howard W. Britton
Attorney, Agent, or Firm—Walter Ottesen

[57] ABSTRACT

The invention is directed to methods and circuit arrangements for video-rapid determination of the median of an evaluation window. In a first step, the gray values of one column of the evaluation window are transferred in accordance with their relative rank to window line memories; in a second step, selection circuit arrangements select gray values in parallel from all window line memories according to their rank relative to one another. Only these selected gray values are then processed in subsequent steps by processing circuit arrangements.

16 Claims, 11 Drawing Figures

Fig. 10

| | n | m | l | u | v | w | |
|---|---|---|---|---|---|---|---|
| a>b>c | 0 | 0 | 1 | 0 | 1 | 1 | ⎫ |
| a>c>b<br>a>c=b<br>a=c>b | 1 | 0 | 1 | 0 | 1 | 1 | ⎬ a |
| a=b=c | 1 | 1 | 1 | 0 | 1 | 1 | ⎭ |
| b>c>a | 0 | 1 | 0 | 1 | 0 | 1 | ⎫ |
| b>a=c<br>b>a>c<br>b=a>c | 0 | 1 | 1 | 1 | 0 | 1 | ⎬ b |
| c>a>b | 1 | 0 | 0 | 1 | 1 | 0 | ⎫ |
| c>b>a<br>c>b=a<br>c=b>a | 1 | 1 | 0 | 1 | 1 | 0 | ⎬ c |

METHOD AND CIRCUIT ARRANGEMENT FOR VIDEO-RAPID DETERMINATION OF THE MEDIAN OF AN EVALUATION WINDOW

FIELD OF THE INVENTION

This invention relates to a method and a circuit arrangement for video-rapid determination of the median of an evaluation window of an image obtained according to a raster process and converted into electrical signals, wherein a high-frequency clock pulse signal subdivides the image into individual raster elements located at fixed positions relative to each other in successive scanning lines, wherein image line memory means corresponding to the length of one line and window line memory means corresponding to the width of the evaluation window simultaneously provide image elements from different columns and rows of the evaluation window for the evaluation, and wherein each raster element is assigned a digital value corresponding to its gray value.

BACKGROUND OF THE INVENTION

For an analysis of a two-dimensional image, the image is scanned in a raster-like pattern by means of a light, laser or electron beam. This process results in electrical signals produced in a receiver which may be a photocell, a photoelectric multiplier or a television receiver tube, for example. These scanning signals are either supplied for evaluation to a discriminator delivering binary signals so that a binary image (black-and-white image) is generated for further image processing, or they are subdivided into gray stages, for example 256, resulting in a gray image which, in the majority of cases, has a significantly higher information content than a binary image and the further processing of which is consequently substantially more complex.

A good dissection of an image is achieved using a generator for producing a high-frequency voltage and synchronizing the generator with the movement of the scanning beam, for example, as disclosed in U.S. Pat. No. 2,494,441 and German published and examined patent application DE-AS No. 1,423,636. This generator supplies a voltage that subdivides the image or the lines into individual raster or image elements.

Numerous methods and circuit arrangements for the further processing of binary images subdivided into individual image elements which can be described by the term "texture analysis" are disclosed in German Pat. Nos. 2,128,690 and 2,354,769, for example.

In view of the numerous gray stages of each individual image element, the processing of digitalized gray images subdivided into image elements necessitates methods and circuit arrangements other than those required for the processing of binary images. As in binary images, in many cases a so-called evaluation window covering several image elements is moved across the image, and the values lying within the boundaries of this window are processed in a defined manner and allocated to the central image point of the evaluation window. Of particular interest in this connection are methods operating "video-rapidly", that is, methods in which the number of processed images issued per unit of time equals the number of images entered on the input side. This means that, for example, twenty-five (25) full images including 625×833 image elements have to be processed per second.

Published European patent application No. 0 068 358 A2 discloses an arrangement wherein a 4×4 window is evaluated video-rapidly by means of parallel processing, with the digitalized gray value of each image element being multiplied by a weighting factor (differing for each location in the evaluation window) followed by the summation of all image elements thus weighted.

Published European patent application No. 0 069 542 A2 describes an arrangement wherein a 3×3 window is evaluated video-rapidly by multiplying the 4-bit gray value of each image element by a weighting factor, followed by the summation of all image elements thus weighted and a comparison of the sum with a limit value.

In addition to such sums of the weighted image elements of an evaluation window, the minimum, maximum and particularly the so-called median of all values within the evaluation window are of special significance for quantitative image analysis. These values may be referred to as operators reflecting an order of rank. The characteristic of the median is to maintain sharp edges in a sharp condition; for an uneven number of m values, it is defined as the value for which $(m-1)/2$ values are smaller or equal and $(m-1)/2$ values are greater or equal. Within the order scheme, it is thus the mean value of a group of values.

It is obvious that the determination of the median requires a great many operations because all values first have to be arranged in their order of rank. While programs suitable for this purpose have already been used in data processing installations, they all have the disadvantage that the numerous operations to be executed require a computing time which is too long for video-rapid evaluation, unless, of course, sophisticated computer systems are used which are too expensive for standard apparatus.

SUMMARY OF THE INVENTION

It is an object of the invention to provide a method and a circuit arrangement for the video-rapid determination of the median of an evaluation window of an image.

The method and circuit arrangement are for an apparatus for image analysis and the image is obtained pursuant to a raster process and converted into electrical signals. The image is subdivided into image elements by means of a high-frequency clock signal such that the image elements are in fixed positions relative to each other in successive scanning lines. Image line memories corresponding to the length of a line and window line memories corresponding to the width of the evaluation window simultaneously provide image elements from different columns and rows of the evaluation window for the evaluation. Each raster element has a gray value to which a digital value is assigned.

The object is achieved according to the method of the invention in that in a first step, on each clock pulse signal, the gray values of a column of the evaluation window are transferred to the window line memories in the order of their relative rank, that in a second step, on each clock pulse signal, gray values are selected in parallel from all window line memories according to their relative rank, and that only these selected gray values are processed in subsequent steps.

It is, of course, also possible to transfer the gray values of a line of the evaluation window to window column memory means in accordance with their relative rank and to subsequently select from window column memory means the gray values in accordance with their rank relative to each other.

It will be an advantage to execute the second step directly as a selection function, but it is of course also possible to execute the second step as a sorting function initially. Such an approach, while yielding the same results, is merely more complex. Since the selection functions can be described much more easily if the execution of a sorting function is initially pretended, the subsequent description will frequently use the image of an evaluation window arranged in columns and rows and refer to gray values assigned to specific locations in the evaluation window in accordance with their relative rank.

In the following, it will always be assumed that subsequent to the sorting operations the smallest value is the one at the top or the left of the window. In this connection, it is to be understood that another procedure could also be applied. Further, the diagonal is always understood to be the line extending through the middle of the evaluation window from bottom left to top right. Since in the evaluation window thus sorted by columns and rows the smallest value (minimum value) is invariably in the top left-hand corner and the largest value (maximum value) in the bottom right-hand corner, the secondary diagonals parallel to the diagonal will be referred to as first minimum diagonal, second minimum diagonal, etc. in the direction of the top, and as first maximum diagonal, second maximum diagonal, etc. in the direction of the bottom of the window.

Following the sorting operation by columns and rows, in a 3×3 evaluation window, the value that is in the middle of the three values along the diagonal is determined. This value is referred to as the median.

In a 5×5 evaluation window, the following values are determined: of the five gray values associated with the diagonal by rank, the middle value; of the four gray values associated with the first minimum diagonal by rank, the maximum value; and, of the four gray values associated with the first maximum diagonal by rank, the minimum value. Subsequently, the mean value of these three values, that is, the median, is established.

In a 7×7 evaluation window, the following values are selected for further processing: the seven gray values associated with the diagonal by rank, the six gray values by rank associated with the first minimum diagonal; the six gray values, by rank, associated with the first maximum diagonal; the maximum value of the gray values associated with the second minimum diagonal by rank; the minimum value of the gray values associated with the second maximum diagonal by rank; and, four redundant values such as the values of an unsorted 5×5 evaluation window. Conveniently, the minimum and the maximum value of the sorted 7×7 evaluation window are used as redundant values, because these values are positively redundant for determination of the median provided that both values are used at equal frequency, and because they are retained in this manner. The latter reason is an advantage because they are, in addition to the median, important order-of-rank operators used for erosion and dilatation.

In a 9×9 evaluation window, the following values are selected for further processing: the nine gray values associated with the diagonal by rank; the eight gray values, by rank, associated with the first minimum diagonal; the eight gray values, by rank, associated with the first maximum diagonal; the seven gray values associated with the second minimum diagonal; the seven gray values, by rank, associated with the second maximum diagonal; the four outer gray values associated with the third minimum diagonal; and the four outer gray values, by rank, associated with the third maximum diagonal; and, two redundant values such as the minimum and maximum gray values of an unsorted 7×7 evaluation window.

In evaluation windows greater than 9×9, the gray values associated by rank to the diagonal and to a maximum possible number of minimum and maximum diagonals are sorted by columns in an arrangement having two columns and two rows less and adding a sufficient number of redundant values; the subsequent selection function follows the same pattern as already described and is continued until a 9×9 arrangement remains to which the procedure described in the preceding paragraph applies.

The methods described may also be modified to suit non-square evaluation windows.

The necessary sorting functions may be performed using known arrangements made up of comparators, memory means and data selectors. Of particular advantage are, however, such arrangements as are described in the copending application Ser. No. 620,130 of the applicants herein and entitled "Circuit Arrangement for Performing Rapid Sortation or Selection According to Rank" filed on June 13, 1984, and assigned to the same assignee as this application.

It is an advantage of the invention that, in addition to the median, also the minimum and the maximum value of an evaluation window and the differential value thereof can be determined video-rapidly.

It is a further advantage that the circuit arrangements are of modular construction, with the larger evaluation windows utilizing the circuit configurations of the smaller evaluation windows, which facilitates expansion of the overall arrangement to accommodate larger evaluation windows or the switching over to evaluation windows of different sizes.

BRIEF DESCRIPTION OF THE DRAWING

The invention will now be described in more detail with reference to the drawing wherein:

FIG. 10 is the truth table for the gate-logic circuit of FIG. 9; and,

DESCRIPTION OF THE PREFERRED EMBODIMENTS OF THE INVENTION

Figure 1:
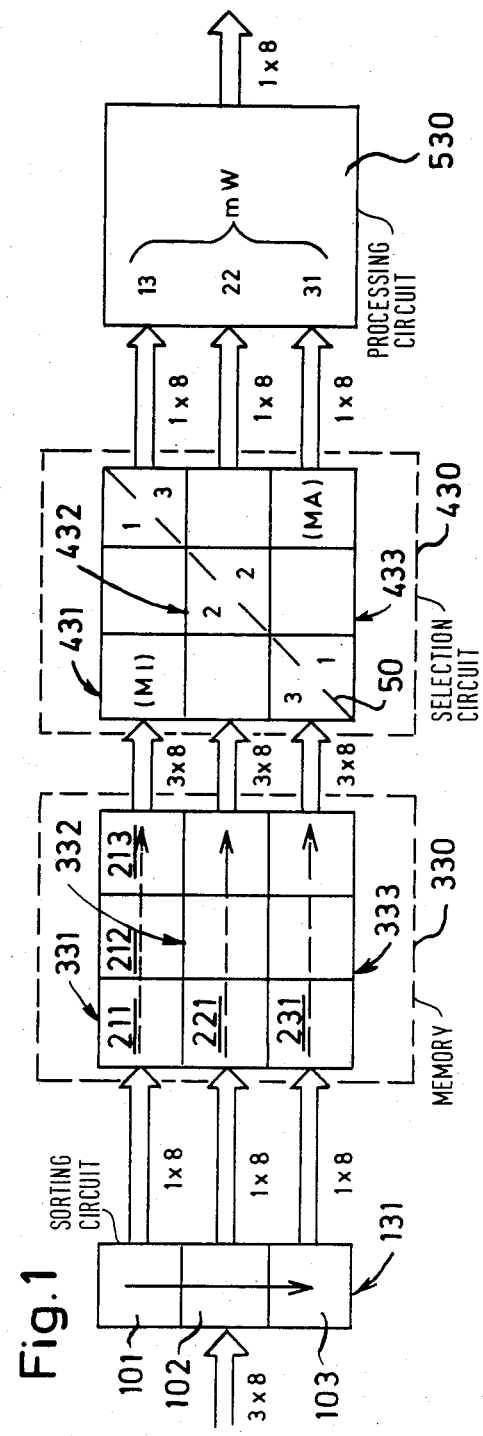
FIG. 1 is a block diagram of a 3×3 evaluation window.

The block diagram of FIG. 1 shows the procedure applicable to a $3 \times 3$ evaluation window. Reference numeral 131 designates a sorting circuit section receiving on each clock pulse the three gray values 101, 102 and 103 of a column of the evaluation window. Reference numeral 101 designates the gray value obtained two rows earlier which was delayed by two image line memories in a known manner. Reference numeral 102 designates the gray value obtained one row earlier; whereas, reference numeral 103 denotes the gray value of the image element which has just arrived. The sorting circuit section 131 determines the order of rank of these three gray values; the lowest value is transmitted to window line memory 331, the mean gray value to window line memory 332, and the highest gray value to window line memory 333. In a $3 \times 3$ evaluation window, each window line memory has three memory locations. On the occurrence of a clock pulse, the values are shifted to the right by one location, with a new value being introduced from the left as the value at the right is pushed out. Accordingly, the three window line memories hold on each clock pulse the $3 \times 3$ values of the evaluation window, these values being already sorted in columns by their respective magnitudes.

Reference numerals 431, 432 and 433 designate selection circuit sections for selecting from their corresponding window line memories gray values in accordance with their relative rank. Selection circuit section 431 selects on each clock pulse the largest one of the three gray values of window line memory 331, selection circuit section 432 selects the mean one of the values held in window line memory 332, and selection circuit section 433 selects the lowest value.

To illustrate which gray values are selected by the selection circuit group 430 as a whole, each selection circuit section is shown with as many quadratic subdivisions as the number of gray values available from which the selection is made. Imagining these gray values to be arranged from left to right in an ascending order, two-digit numbers are entered in the locations corresponding to the selected gray values, with the first and the second digit indicating the row and the column, respectively.

Accordingly, the overall arrangement of the selection circuit sections with their quadratic subdivisions has been chosen to indicate which positions of the evaluation window sorted by columns and imaginarily sorted by rows are selected. In this form of illustration, the smallest value MI of the evaluation window is invariably in the top left-hand corner and the largest value MA is invariably in the bottom right-hand corner. When reference indications MI and MA are shown in parenthesis, both in FIG. 1 and in FIG. 2, this means that they are not needed for the further determination of the median value.

Thus, the selection circuit group 430 of FIG. 1 selects the values associated by their relative rank with diagonal 50 and routes them to a processing circuit group 530. In the case shown, this circuit group 530 is merely made up of a circuit section which determines the mean value or median among the three gray values applied to its input. A detailed description of the individual circuit sections is provided with reference to FIGS. 5 to 8. The numbers shown at the data buses indicate the number of lines or, more specifically, how many gray values of eight bits each are transmitted per clock pulse through the corresponding data bus. Of course, it is also possible to use gray values made up of more or less than eight bits.

Figure 2:
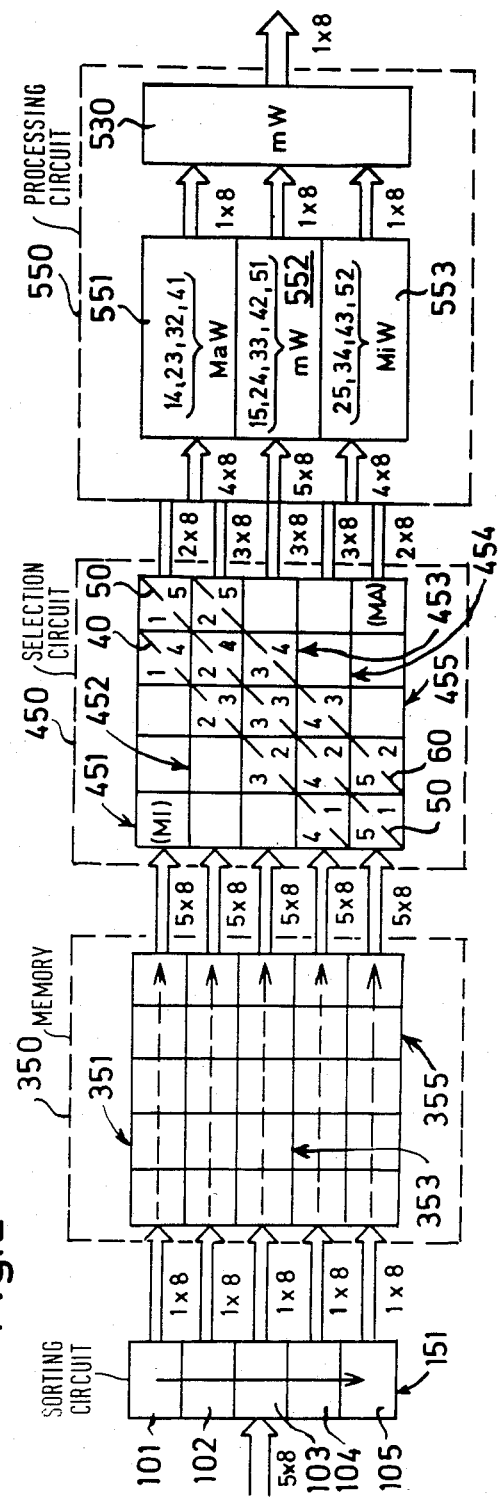
FIG. 2 is a block diagram of a 5×5 evaluation window.

FIG. 2 shows the block diagram for the determination of the median value of a $5 \times 5$ evaluation window. Reference numeral 151 designates a sorting circuit section receiving on each clock pulse the five gray values 101 to 105 of a column of the evaluation window. Sorting circuit section 151 establishes the relative order of rank of the five gray values which are transmitted according to their magnitude to the window line memories 351 to 355, with the smallest value being again stored in the topmost 351 and the highest value in the bottommost 355 window line memory. In a $5 \times 5$ evaluation window, each window line memory has five memory locations.

Selection circuit group 450 includes five selection circuit sections 451 to 455 each of which is allocated to one of the window line memories 351 to 355. The selection circuit sections select from the window line memories specific values in accordance with the rank of the gray values held therein, and deliver them to the processing circuit group 550. Here again, the selection circuit sections are illustrated in a manner indicating which locations of the evaluation window sorted by columns and imaginarily by rows are selected. The gray values along the first minimum diagonal 40 are routed to circuit section 551 of the processing circuit group 550 and the maximum value MaW is determined therefrom. The gray values along diagonal 50 are routed to a circuit section 552 for determination of the mean value mW in order of rank. The gray values along the first maximum diagonal 60 are routed to circuit section 553 for determination of the minimum value MiW. The three values thus determined are finally delivered to circuit section 530 already known from FIG. 1 to establish their mean value; this value is the median of the evaluation window.

Figure 3:
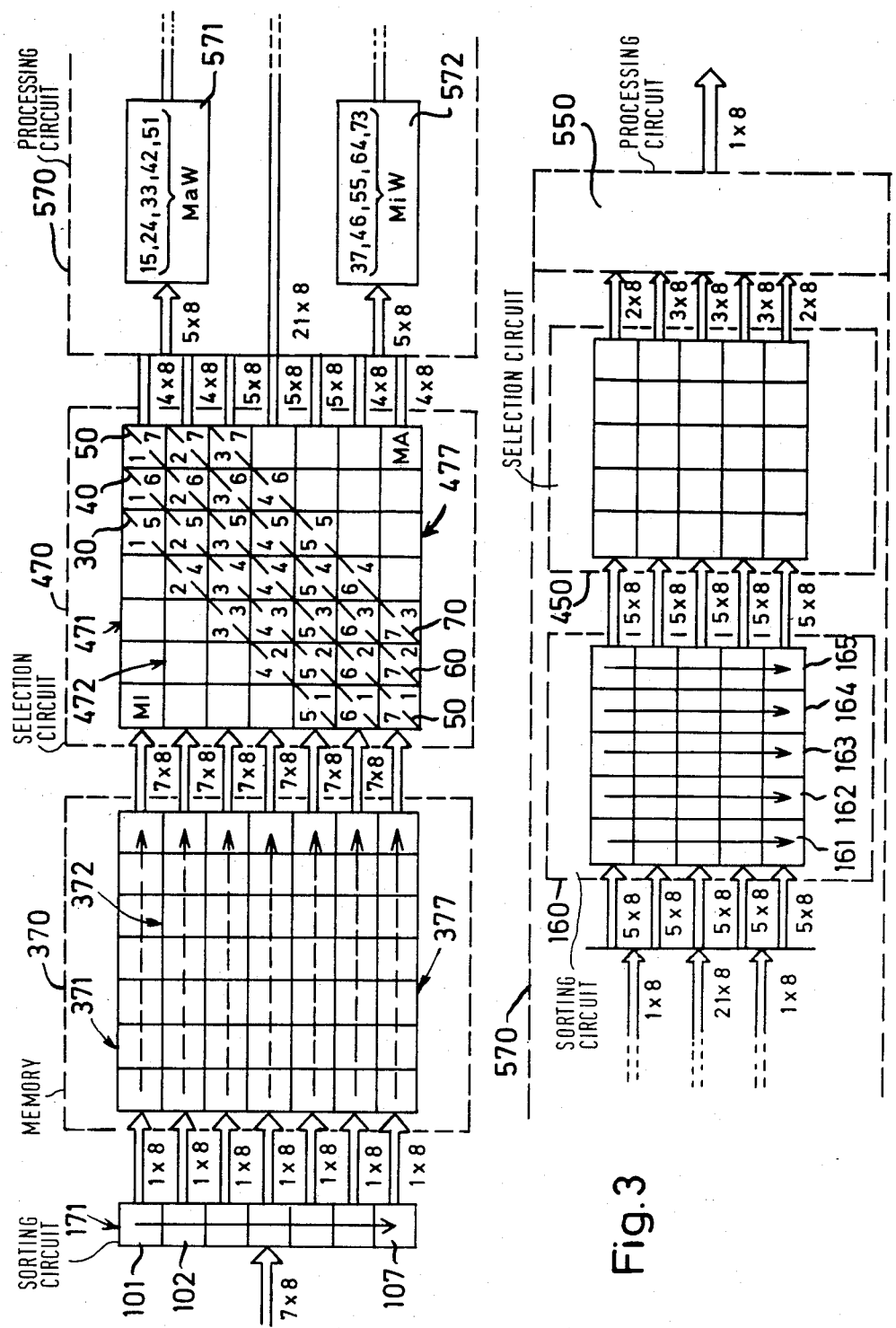
FIG. 3 is a block diagram of a 7×7 evaluation window.

FIG. 3 shows the block diagram for determination of the median of a $7 \times 7$ evaluation window. Sorting circuit section 171, window line memories 371 to 377 and selection circuit group 470 with its seven selection circuit sections 471 to 477 are configured and illustrated in full accordance with the smaller evaluation windows. Of the values selected, the gray values along the second minimum diagonal 30 are routed to circuit section 571 of processing circuit arrangement 570 for determination of the maximum value MaW. The minimum value MiW is determined in circuit section 572 from the gray values along the second maximum diagonal 70. These two values are routed, together with the other 21 selected values, to sorting circuit group 160 including sorting circuit sections 161 to 165 for sorting a $5 \times 5$ arrangement. Since this $5 \times 5$ arrangement requires 25 values, minimum value MI and maximum value MA are used twice. The allocation of the values to the locations of circuit group 160 is arbitrary. Sorting circuit group 160 is followed by selection circuit group 450 and processing circuit group 550 for a $5 \times 5$ evaluation window, these arrangements being already known from FIG. 2.

Figure 4:
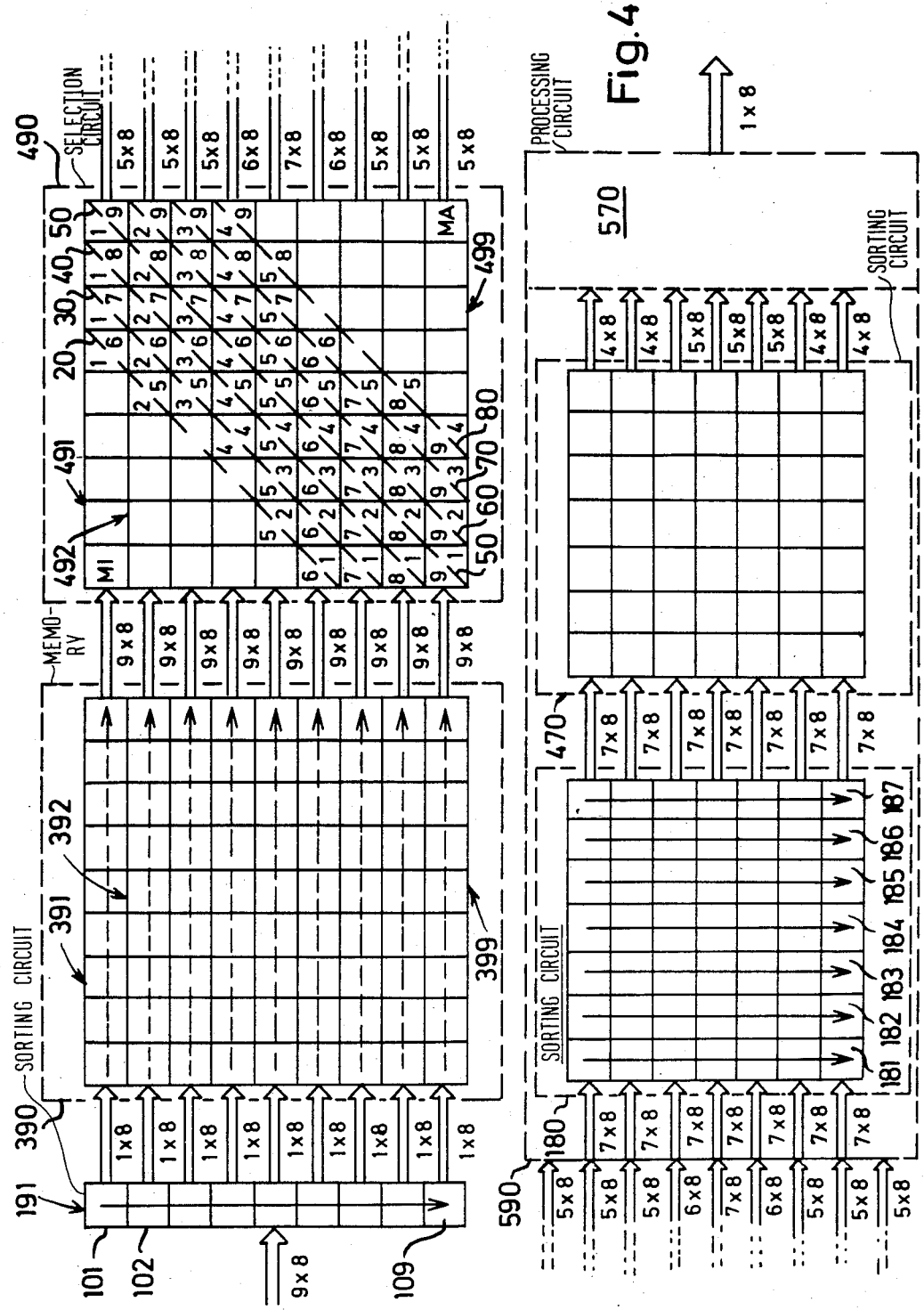
FIG. 4 is a block diagram of a 9×9 evaluation window.

The block diagram of FIG. 4 illustrates the determination of the median value for a $9 \times 9$ evaluation window. Again, sorting circuit section 191, window line memories 391 to 399 generally indicated by 390, and selection circuit group 490 with its nine selection circuit sections 491 to 499 are configured and illustrated in full accordance with the smaller evaluation windows. In evaluation windows of this size and larger, all selected values are directly delivered to a sorting circuit group for sortation column by column. This sorting circuit group corresponds always to an arrangement which is smaller by two columns and two rows. In the case of the 9×9 evaluation window, it is the sorting circuit group 180 for sorting a 7×7 arrangement column by column. Again, the allocation to the individual locations is arbitrary. Sorting circuit group 470 and processing circuit group 570 follow the selection circuit group 180 in cascade for a 7×7 evaluation window, these groups being already known from FIG. 3.

For evaluation windows larger than 9×9, the architecture of the entire circuitry is similar to that for smaller windows, with selection circuit groups and sorting circuit groups, reduced by two columns and two rows, being connected in series until the selection circuit group 490 for a 9×9 evaluation window remains which is then followed by processing circuit group 590.

The description of the following four FIGS. relates to details of the circuit sections included in the above block diagrams.

First, an embodiment of the circuit section 131 of FIG. 1 which transmits three input values to three different memories according to their relative magnitudes will be explained with reference to FIG. 5. Next, FIG. 6 illustrates a particularly advantageous embodiment for performing the same task. In both FIGS. 5 and 6, the three input values are identified by reference numerals 101, 102 and 103 as in FIG. 1; however, in FIGS. 5 and 6, the three input values are identified by a, b and c for brevity. The memories receiving the gray values in order of their magnitude are identified by reference numerals 211, 221 and 231 as in FIG. 1.

Figure 5:
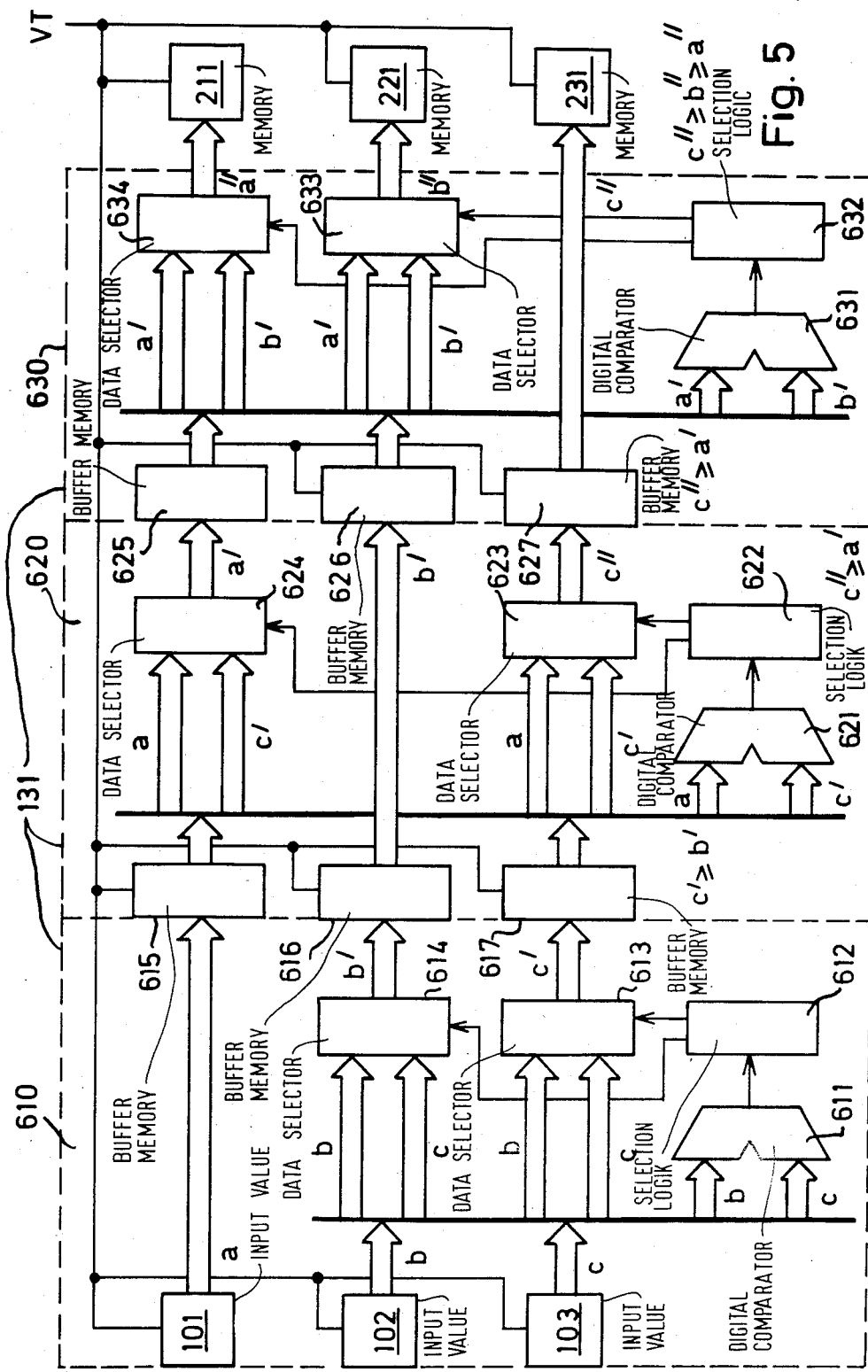
FIG. 5 is a diagram of a sorting circuit section for clockwise transmission of the gray values of a 3-value column according to their rank.
Figure 6:
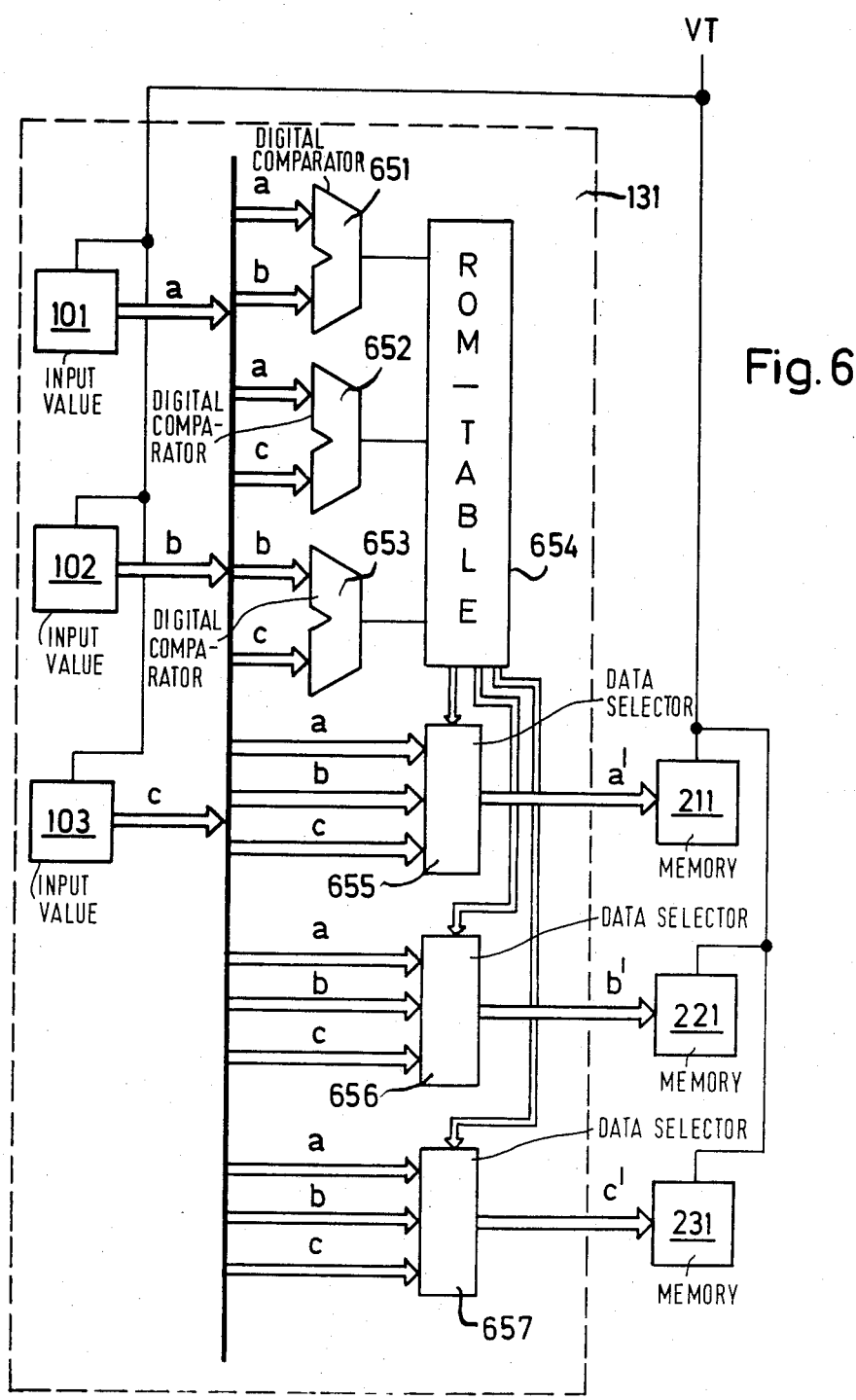
FIG. 6 is a diagram of a sorting circuit section with the same function as the one of FIG. 5 and embodying a particularly advantageous configuration.

In the embodiment of FIG. 5, a digital comparator or an arithmetic logic unit (ALU) 611 compares the values b and c in a first circuit section 610. A selection logic 612 which is conveniently made up of gates but may also be a ROM table, activates the two data selectors 613 and 614 which have applied to their inputs the two values b and c; data selectors 613 and 614 each allow passage of one of the gray values in accordance with the magnitude of b in relation to c. Regarding the gray values b' and c' present at the outputs of data selectors 614 and 613, respectively, the condition $c' \geq b'$ applies. In circuit portions 620 and 630, the same operation is performed on gray values a and c' and, a' and b', respectively, so that gray values a", b" and c" are present in a sorted sequence at the output of the entire circuit unit 131 whereat the condition $c'' \geq b'' \geq a''$ applies. It is in this order that the gray values will be transferred to memories 211, 221 and 231.

In circuit arrangements of this type, the transfers from one memory to another are accomplished by means of a video clock signal VT. In the circuit arrangement shown in FIG. 5, the step-by-step comparison operation necessitates buffer memories, for example, 615, 616, 617, 625, 626, 627, which result in a relatively complex structure particularly if circuit sections for larger evaluation windows are involved.

More advantageous than this circuit arrangement is the one of FIG. 6, the architecture of which is described in detail in our copending application, Ser. No. 620,130 which was filed on June 13, 1984 and which was referred to above. This architecture will be briefly explained in simplified form herein with reference to the following FIGS. 6 to 8 whereafter a more complete explanation will be provided with reference to FIGS. 9 to 11.

In FIG. 6, all three gray values a, b and c are compared with each other simultaneously by three ALU's or digital comparators 651, 652 and 653. The carry or sign outputs of the ALU's are used as addresses for the ROM table 654 which holds the control information for data selectors 655, 656 and 657; each of these data selectors connects through one of the three channels so that the channels are subsequently arranged in accordance with the order of rank of their gray values. This circuit arrangement not only dispenses with the need for buffer memories, but also reduces data selector complexity.

Figure 7:
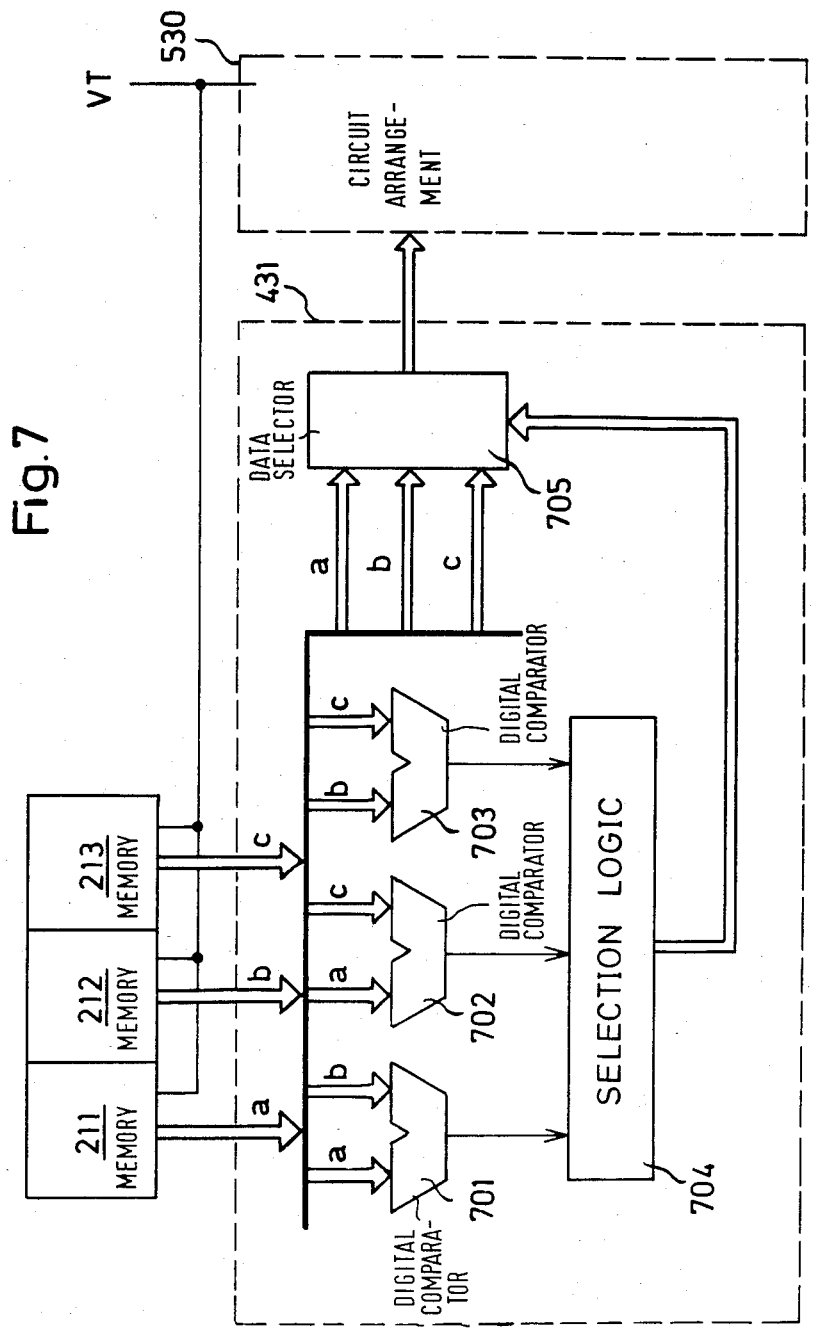
FIG. 7 is a diagram of a selection circuit section for selecting a gray value from a 3-value row.

According to the same circuit principle, FIG. 7 illustrates the circuit section 431 in which the largest one of the three gray values of memories 211, 212 and 213 of FIG. 1 is determined and transmitted to circuit arrangement 530. (While this function corresponds to the embodiment illustrated in FIG. 1 of the application, merely another form of representation was chosen for FIG. 7 which is better suited to the remaining description.) Again, the three gray values a, b an c are compared simultaneously by three ALU's 701, 702 and 703. The carry or sign outputs are routed to a selection logic 704 for which a logic made up of gates will suffice in this case. In the selection logic 704, they will be converted into the necessary control information for data selector 705 which, on each video clock signal VT, will provide for transfer of the largest one of the three gray values held in memories 211, 212 and 213 to circuit arrangement 530. (At the same time, new gray values will be moved into memories 211 to 213.)

Figure 8:
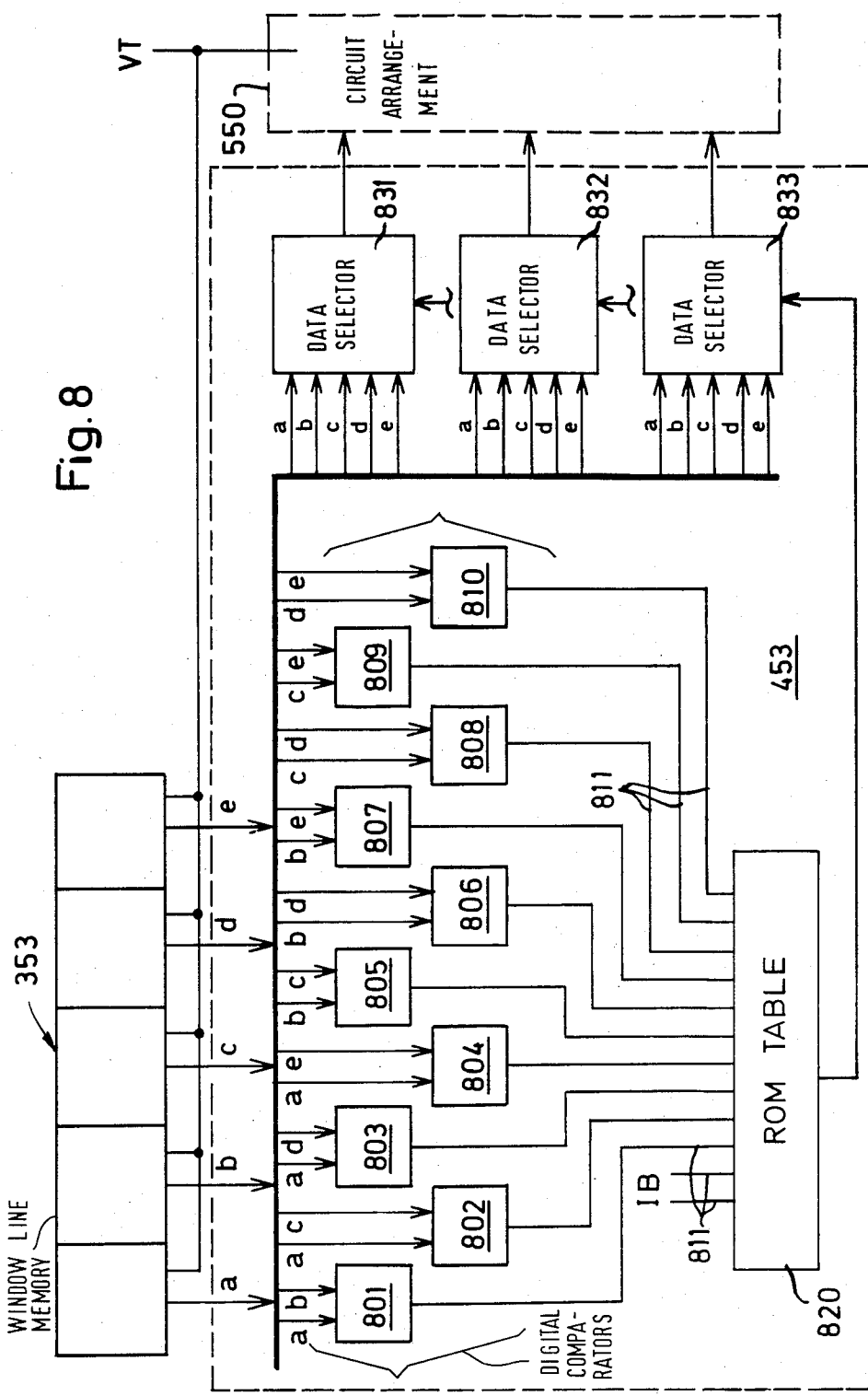
FIG. 8 is a diagram of a selection circuit section for selecting three gray values out of five gray values.

As a last example, FIG. 8 illustrates the structure of circuit section 453 selecting the three largest gray values out of the five gray values of the window line memory 353 and providing for their transfer to circuit arrangement 550. Comparing five values concurrently requires ten ALU's or ten digital comparators 801 to 810. Their outputs are again used as address lines for the ROM table 820 which holds the control information for the three data selectors 831 to 833. Data selector 831 selects the largest one of all five gray values, data selector 832 the second largest one, and data selector 833 the third largest one for subsequent transfer to circuit arrangement 550.

All other circuit sections illustrated in the block diagrams of FIGS. 1 to 4 are configured in full accordance with the circuit sections explained with reference to FIGS. 6 to 8. The number of gray values on which the selection or sort function is to be performed determines the number of digital comparators or ALU's. The number of gray values to be selected or sorted determines the number of data selectors which are activated by a ROM table or a gate logic. Sorting circuit groups 160 and 180 are made up of five (161 to 165) and seven (181 to 187) identical circuit sections, respectively, operating in parallel to one another.

The circuit sections of the ROM tables afford a particularly advantageous embodiment which is indicated in FIG. 8. In addition to the ten address lines arriving from the digital comparators or ALU's, two further lines identified by IB are provided. Via these lines, the bit pattern of an instruction bus may be supplied, providing an additional address information. For any possible combination of gray values of input channels a to e, several items of control information may thereby be made available to the data selectors among which the selection may be performed via the instruction bus; in addition, the instruction buses of the ALU's may also be included in the process, as the case may be. In this manner, it is possible to determine with one circuit arrangement not only the median of an evaluation window but also, for instance, the maximum and the minimum value, which is accomplished simply by switching the instruction bus for the ROM tables. While the determination of the maximum and minimum value of an evaluation window does not require such a complex circuit arrangement as the determination of the median, it is, however, a significant advantage to be able to execute these order-of-rank operators for dilatation and erosion using the same circuit arrangement.

Figure 9:
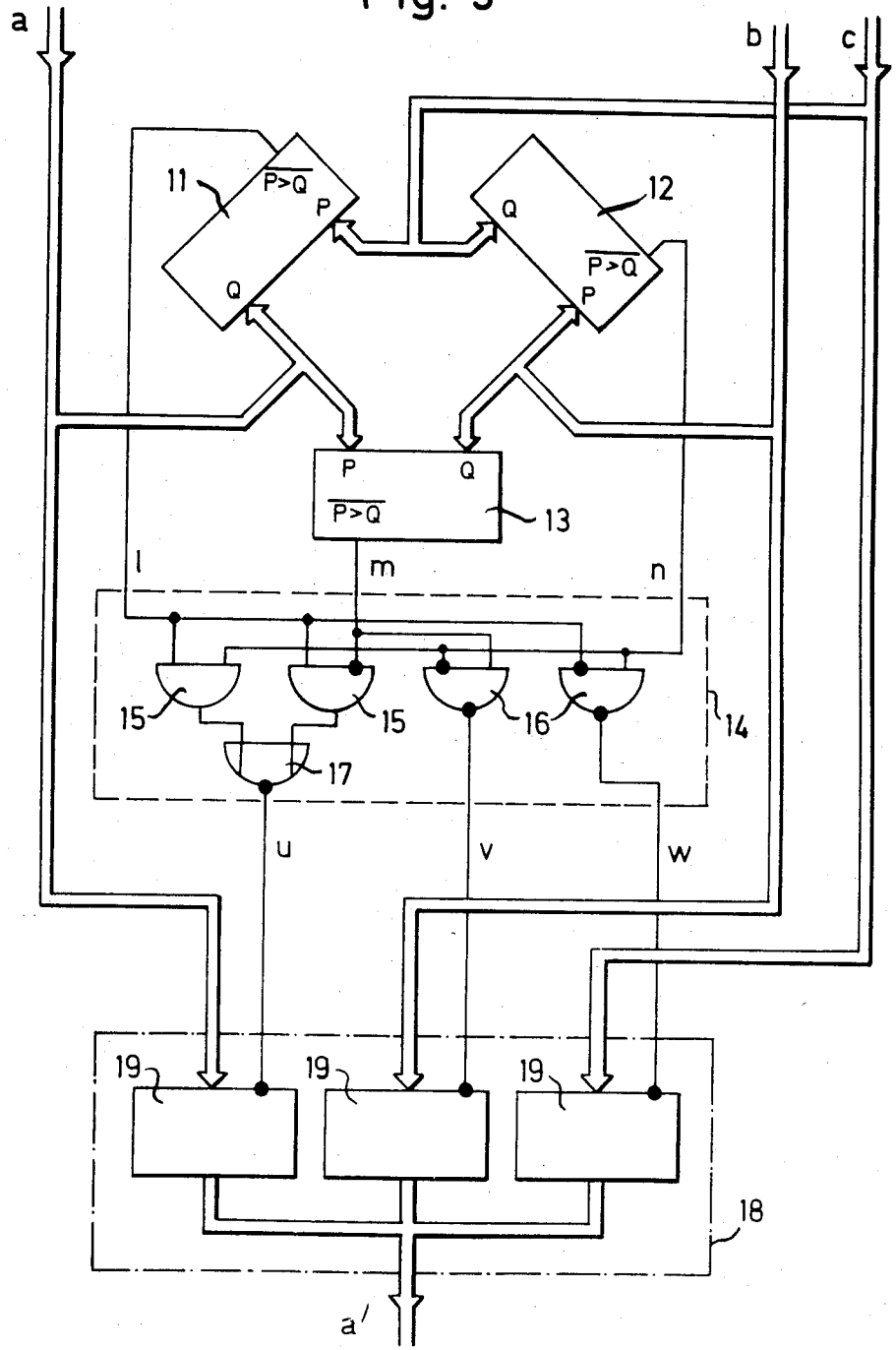
FIG. 9 is a circuit arrangement for the selection of three input values according to rank, using digital comparators and a gate-logic circuit for the selection of, for example, the largest input value.

The architecture discussed above will now be more fully described with reference to FIGS. 9 to 11. Referring now to FIG. 9, reference letters a, b and c identify three input channels each of which is made up of say, eight lines so that each channel will transmit eight bits in parallel. Via inputs P and Q of the three digital comparators 11, 12 and 13, the three input channels a, b and c are interconnected with one another "cyclically" so that the values of all three input channels are compared with one another simultaneously.

In the embodiment shown, the inverted outputs $\overline{P>Q}$ of the three digital comparators used are connected to gate-logic circuit 14 through lines 1, m and n. It is, or course, also possible to use the outputs $\overline{P<Q}$ or to use different outputs with different comparators. The units of information arriving from the digital comparators 11, 12 and 13 are suitably processed in gate-logic circuit 14 to control the data selector 18 via lines u, v and w. In this arrangement, the gate-logic circuit configuration depend on which digital comparators 11, 12, 13 and date selector 18 are used. The latter is made up of commercially available modules, in the embodiment of FIG. 9, for example, of three bus drivers 19 having tristate outputs eight bits wide (Texas Instruments 74 LS 244) one of which is connected through while the others are opened, whereby one of the three input channels a, b or c becomes output channel a' to be coupled to another circuit section.

If, in addition, Texas Instruments 74 LS 682 type digital comparators are used and if it is desired to couple, for each comparator the input channel at which the largest value is present to a further circuit section, gate-logic circuit 14 may be configured according to FIG. 9 which includes AND gates 15, NAND gates 16 and NOR gate 17. FIG. 10 shows the truth table for this configuration. The first column of this table contains all possible combinations for the values of the three input channels a, b and c. The next three columns indicate the levels of lines l, m and n, with 0 meaning a low and 1 a high level. (The combination 0 0 0 does not occur.) The next three columns indicate the levels of the control lines u, v, w as generated by the gate-logic circuit for transfer to the bus drivers 19. Finally, the last column indicates which of the three input channels is coupled to the subsequent circuit section (not shown in FIG. 9).

It is to be understood that in this example the ROM table described with reference to FIG. 11 may be used in place of gate-logic circuit 14. Likewise, the ALU's and the data selector network described with reference to FIG. 11 may be substituted for the digital comparators and the data selector.

Figure 11:
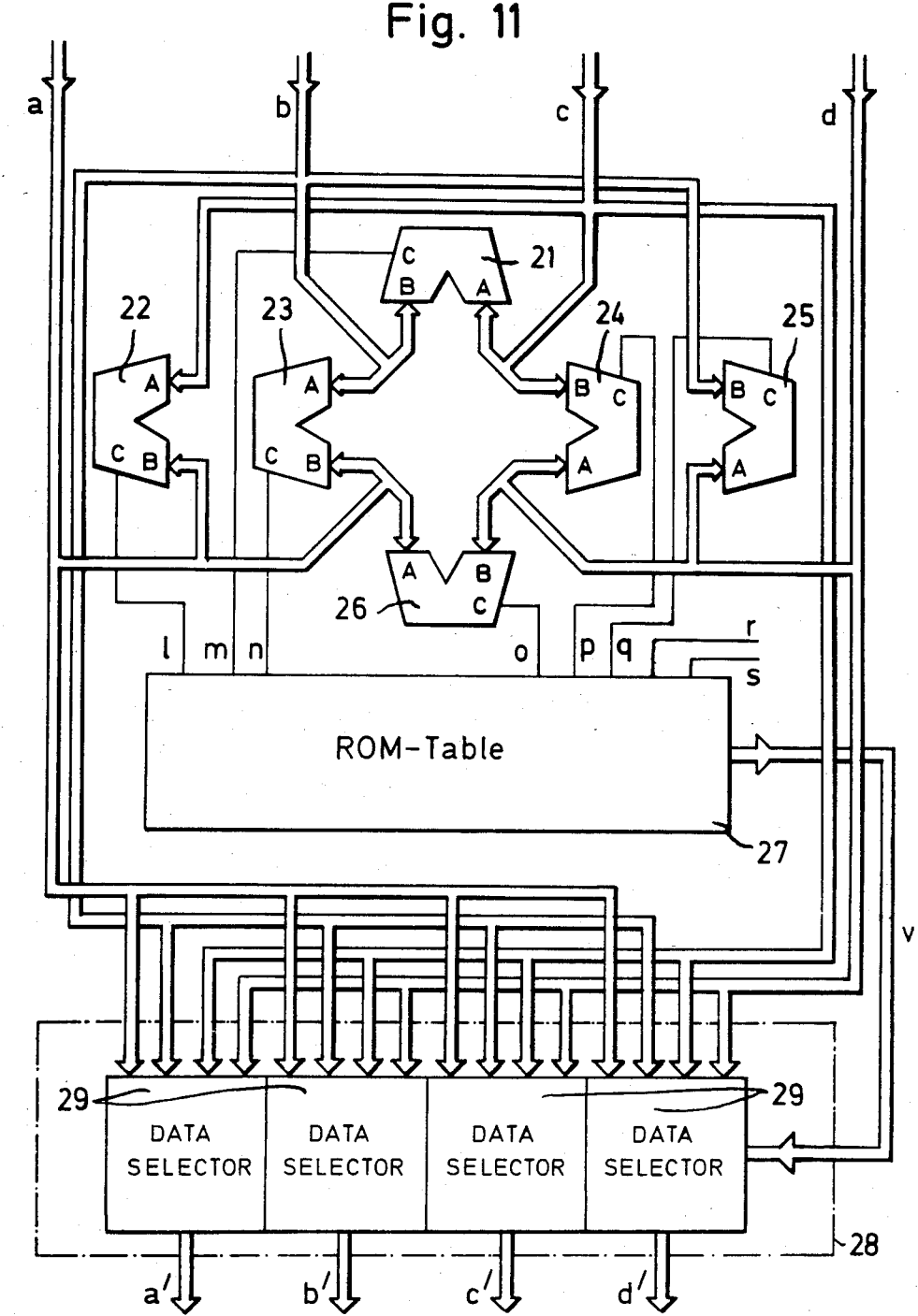
FIG. 11 is a circuit arrangement for sorting four input values according to rank, using ALU's, a ROM table as an evaluation circuit and a network of data selectors for transferring the input values in the established order of rank.

FIG. 11 shows an embodiment using four input channels a, b, c and d. Via inputs A and B of the six arithmetic logic units (ALU's) 21 to 26, the four input channels are interconnected with one another so that the values of all four input channels are compared with one another simultaneously. In the embodiment shown, the carry outputs of ALU's 21 to 26 are connected to the ROM table 27 via lines l to q. It is, of course, also possible to utilize the ALU sign outputs. In either case, the subtraction instructions are issued to all ALU's through lines not shown. The six signal lines l to q are used as addresses for the ROM table, that is, each possible combination of carry bits is allotted a memory location in the ROM table which holds the corresponding control information for the data selector network 28.

The data selector network 28 is made up of as many data selectors 29 as the circuit arrangement possesses input channels; controlled by the ROM table, each data selector 29 connects through a different input channel so that the input channels a to d will appear on the network output side resorted in the sequence a' to d' corresponding to their defined rank order. It is also possible to select two or three of the input channels, for example, the one with the lowest value and the one with the highest value. In this case, two data selectors 29 of FIG. 11 would be omitted.

It is a particular advantage to supply additional bit patterns of an instruction bus to the ROM table through one or several address lines r, s. For any possible combination of the values of input channels a to d, several items of control information may thereby be made available to the data selectors among which the selection may be performed via the instruction bus. In addition, the instruction buses for the ALU's may also be included in the process, as the case may be.

It is to be understood that the invention as illustrated in the embodiment of FIGS. 9 and 11 also applies to more than four input channels. In the embodiments described, three and four input channels were merely chosen for the sake of maximum clarity.

One field of application for the circuit arrangements described is the video-rapid image analysis. Further advantageous possibilities of application exist in all areas of digital signal processing using hardware circuits.

It is to be understood that the methods and circuit arrangements described herein are not limited to on-line image processing applications. For example, they may also be advantageously used for the evaluation of images stored in image storage means using hardware circuitry.

It is further understood that the foregoing description is that of the preferred embodiments of the invention and that various changes and modifications may be made thereto without departing from the spirit and scope of the invention as defined in the appended claims.

What is claimed is:

1. A method for video-rapidly determining the median of an evaluation window of an image obtained pursuant to a raster process and converted into electrical signals, wherein: the image is subdivided into image elements by means of a high-frequency clock signal such that the image elements are in fixed positions relative to each other in successive scanning lines; image line memories corresponding to the length of a line and window line memories corresponding to the width of the evaluation window simultaneously provide image elements from different columns and rows of the evaluation window for the evaluation; and, each raster element has a gray value to which a digital value is assigned; the method comprising the steps of:

transferring with each clock signal the gray values of a column of the evaluation window into respective ones of the window line memories in accordance with their rank compared to one another;

selecting gray values in parallel with each other according to their rank with respect to each other from all of said window line memories at each clock pulse; and, processing only those gray values selected from said window line memories.

2. The method of claim 1, wherein the evaluation window is a 3×3 evaluation window that includes a selection circuit group defining a diagonal passing through the center thereof and to which three gray values belong by rank, said step of selecting gray values including selecting said last-mentioned three values and determining the median thereof.

3. The method of claim 1, wherein the evaluation window is a 5×5 evaluation window that includes a selection circuit group defining: a diagonal passing through the center thereof and to which five gray values belong by rank; a first minimum diagonal to which four gray values belong by rank; and, a first maximum diagonal to which four gray values belong by rank; said step of selecting gray values including: determining the median (mM) of said five gray values; determining the maximum value (MaW) of said first-mentioned four gray values; determining the minimum (MiW) of said last-mentioned four gray values; and, determining the median of said three values (mM, MaW, MiW).

4. The method of claim 1, wherein the evaluation window is a 7×7 evaluation window that includes a selection circuit group defining: a diagonal passing through the center thereof and to which seven gray values belong by rank; a first minimum diagonal to which six gray values belong by rank; a first maximum diagonal to which six gray values belong by rank; a second minimal diagonal to which gray values belong by rank, said last-mentioned gray values having a maximum value (MaW); a second maximum diagonal to which gray values belong by rank, said last-mentioned gray values having a minimum value (MiW); and, four redundant gray values; said processing step including further processing: said seven gray values; said six first-mentioned gray values; said second-mentioned six gray values; said maximum value (MaW); said minimum value (MiW); and, said four redundant gray values in the manner of processing gray values of an unsorted 5×5 evaluation window.

5. The method of claim 1, wherein the evaluation window is a 9×9 evaluation window that includes a selection circuit group defining: a diagonal passing through the center thereof and to which nine gray values belong by rank; a first minimal diagonal to which eight gray values belong by rank; a first maximal diagonal to which eight gray values belong by rank; a second minimal diagonal to which seven gray values belong by rank; a second maximum diagonal to which seven gray values belong by rank; a third minimum diagonal to which four outer gray values belong by rank; a third maximum diagonal to which four outer gray values belong by rank; and, two redundant gray values; said processing step including further processing: said nine gray values, said first-mentioned eight gray values; said second-mentioned eight gray values; said first-mentioned seven gray values; said second-mentioned seven gray values; said first-mentioned four gray values; said second-mentioned four gray values; and, said two redundant gray values in the manner of processing gray values of an unsorted 7×7 evaluation window.

6. The method of claim 1, wherein the evaluation window is a n×n evaluation window and n is an uneven whole number greater than 9, the n×n evaluation window including a selection circuit group defining a diagonal passing through the center thereof, a plurality of minimum diagonals up to the level (n−3)/2 and a plurality of maximum diagonals up to the (n−3)/2, all of said diagonals having gray values belonging thereto, and having an adequate number of redundant gray values; said processing step including processing all of said gray values like the unsorted gray value of a (n−2)×(n−2) arrangement, and continuing this stepwise reduction up to a 9×9 evaluation window and thereafter proceeding as with a 9×9 evaluation window.

7. A circuit arrangement for video-rapidly determining the median of an evaluation window of an image obtained pursuant to a raster process and converted into electrical signals, wherein: the image is subdivided into image elements by means of a high-frequency clock signal such that the image elements are in fixed positions relative to each other in successive scanning lines; image line memories corresponding to the length of a line and window line memories corresponding to the width of the evaluation window simultaneously provide image elements from different columns and rows of the evaluation window for the evaluation; and, each raster element has a gray value to which a digital value is assigned; the circuit arrangement comprising:

clock pulse generator means for generating clock pulses;

window line memory means including a plurality of window line memories corresponding in number and size to the evaluation window;

sorting circuit means for sorting by rank a plurality of gray values corresponding to a column of the evaluation window and for transferring the same to respective ones of said window line memories in response to a clock pulse from said clock pulse generator means;

selection circuit means for parallelly selecting gray values by rank from respective ones of said window line memories in response to said clock pulse; and, processing circuit means for processing the gray values selected by said selection circuit means.

8. The circuit arrangement of claim 7 for a 3×3 evaluation window, said selection circuit means defining a diagonal and said window line memory means including three window line memories, said process circuit means being connected, with each of said clock pulses, though said selection circuit means to said three memories of the gray values belonging by rank to said diagonal; said process circuit means including a circuit portion for determining the median (mW) of three gray values.

9. The circuit arrangement of claim 7 for a 5×5 evaluation window, said selection circuit means defining a central diagonal to which five gray values belong by rank, a first minimum diagonal to which four gray values belong by rank, and a first maximum diagonal to which four gray values belong by rank, said process circuit means being connected, with each of said clock pulses, through said selection circuit means to said window line memories of said gray values; said process circuit means including: first circuit means for determining the median (mM) of said five gray values of said center diagonal; second circuit means for determining the maximum value (MaW) from said four gray values of said first minimum diagonal; third circuit means for determining the minimal value (MiW) from said four gray values of said first maximum diagonal; and, a fourth circuit portion for determining the median (mW) from said three values (mW, MaW, MiW).

10. The circuit arrangement of claim 7 for a 7×7 evaluation window, said selection circuit means defining: a central diagonal, a first minimum diagonal, a first maximum diagonal, all of said diagonals having gray values belonging in rank thereto, a second minimum diagonal to which five gray values belong by rank and a second maximum diagonal to which five gray values belong by rank, and, including up to four memories with redundant gray values (MI and MA); said process circuit means being connected, with each of said clock pulses, through said selection circuit means to said window line memories of said gray values and to memories of said redundant gray values; said process circuit means including: first circuit means for determining the maximum value (MA) from said five gray values of said second minimum diagonal, second circuit means for determining the minimal value (MiW) from said five gray values of said second maximum diagonal; a 5×5 evaluation window sorting circuit means for columnar sorting said 5×5 evaluation window; selection circuit means for said 5×5 evaluation window; and, processing circuit means for said 5×5 evaluation window.

11. The circuit arrangement of claim 7 for a 9×9 evaluation window, said selection circuit means defining: a central diagonal; a first minimum diagonal; a first maximum diagonal; a second minimum diagonal; a second maximum diagonal, all of said diagonals having gray values belonging in rank thereto, a third minimum diagonal having four outer positions belonging thereto, a third maximum diagonal having four outer positions belonging thereto, and two positions with redundant values (MI and MA); said process circuit means being connected, with each of said clock pulses, through said selection circuit means to said window line memories of said gray values, to the memories of said first-mentioned four outer positions, to the memories of said second-mentioned four outer positions, and to the memories of said two positions; said process circuit means including: a 7×7 evaluation window; a sorting circuit means for columnar sorting said 7×7 evaluation window; selection circuit means for said 7×7 evaluation window; and, process circuit means for said 7×7 window.

12. The circuit arrangement of claim 7 for a n×n evaluation window and n is an uneven whole number greater than nine, said selection circuit means defining: a central diagonal, a plurality of minimum diagonals up to the level $(n-3)/2$ and a plurality of maximum diagonals up to the level $(n-3)/2$, all of said diagonals having gray values belonging by rank thereto; and, defining positions with redundant values (MI and MA); said process circuit means being connected, with each of said clock pulses, via said selection circuit means to said window line memories of said gray values and to said positions; said process circuit means including: a $(n-2)\times(n-2)$ arrangement; and, sorting circuit means for columnar sorting said $(n-2)\times(n-2)$ arrangement; and, said process circuit means further including: a $(n-4)\times(n-4)$ arrangement; sorting circuit means for columnar sorting said $(n-4)\times(n-4)$ arrangement; and, selection circuit means for connecting, with each clock pulse, said window line memory means containing said gray values corresponding to said diagonals and said positions with said redundant values to said sorting circuit means for said columnar sorting of said $(n-4)\times(n-4)$ arrangement whereby an adequate number of sorting circuit means and selection circuit means are provided until selection circuit means for a 9×9 evaluation window is reached which, in turn, is connected to process circuit means for a 9×9 evaluation window.

13. The circuit arrangement of claim 7, said sorting circuit means including: a plurality of input channels for receiving a corresponding plurality of input gray values; first logic means for comparing each one of said inputs with another one of the latter; data selection means for selecting and passing said gray values by rank to said window line memory means; second logic means for actuating said data selection means in response to inputs from said first logic means; and, intermediate storage means interconnected with said data selection means; said first logic means being selected from the group including digital comparator means and arithmetic logic unit means; and, said second logic means being selected from the group including gate logic means and ROM table means.

14. The circuit arrangement of claim 13, said ROM table means including a plurality of address inputs; instruction bus means allocated to a portion of said address inputs for supplying a bit pattern for altering the quantities of the evaluation window which are determined.

15. The circuit arrangement of claim 7, said sorting circuit means including: a plurality of input channels for receiving a corresponding plurality of input gray values; first logic means for comparing each one of said inputs with another one of the latter; data selection means for selecting and passing said gray values by rank directly to said window line memory means; and, second logic means for actuating said data selection means in response to inputs from said first logic means; said first logic means being selected from the group including digital comparator means and arithmetic logic unit means; and, said second logic means being selected from the group including gate logic means and ROM table means.

16. The circuit arrangement of claim 15, said ROM table means including a plurality of address inputs; instruction bus means allocated to a portion of said address inputs for supplying a bit pattern for altering the quantities of the evaluation window which are determined.

* * * * *

UNITED STATES PATENT AND TRADEMARK OFFICE
CERTIFICATE OF CORRECTION

PATENT NO. : 4,597,009

DATED : June 24, 1986

INVENTOR(S) : Horst Ballmer and Henry Krämer

It is certified that error appears in the above-identified patent and that said Letters Patent is hereby corrected as shown below:

In column 4, line 62: delete "values." and substitute -- values; -- therefor.

In column 5, line 61: delete "parenthesis" and substitute -- parentheses -- therefor.

In column 7, line 43: delete "612 which" and substitute -- 612, which -- therefor.

In column 8, line 26: delete "b an c" and substitute -- b and c -- therefor.

In column 9, line 30: delete "or" and substitute -- of -- therefor.

UNITED STATES PATENT AND TRADEMARK OFFICE
CERTIFICATE OF CORRECTION

PATENT NO. : 4,597,009                              Page 2 of 2

DATED : June 24, 1986

INVENTOR(S) : Horst Ballmer and Henry Krämer

It is certified that error appears in the above-identified patent and that said Letters Patent is hereby corrected as shown below:

In column 9, line 37: delete "depend" and substitute -- depends -- therefor.

In column 9, line 38: delete "date" and substitute -- data -- therefor.

Signed and Sealed this

Thirtieth Day of September 1986

[SEAL]

Attest:

DONALD J. QUIGG

Attesting Officer      Commissioner of Patents and Trademarks